United States Patent
Trapanese et al.

(10) Patent No.: US 11,963,128 B2
(45) Date of Patent: Apr. 16, 2024

(54) EVALUATING IP LOCATION ON A CLIENT DEVICE

(71) Applicant: Google LLC, Mountain View, CA (US)

(72) Inventors: Antonio Trapanese, Zurich (CH); Ankit Gupta, Zurich (CH); Pawel Walczak, Pfaffikon (CH)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 16/617,301

(22) PCT Filed: Nov. 6, 2017

(86) PCT No.: PCT/US2017/060172
§ 371 (c)(1),
(2) Date: Nov. 26, 2019

(87) PCT Pub. No.: WO2019/089056
PCT Pub. Date: May 9, 2019

(65) Prior Publication Data
US 2020/0169979 A1    May 28, 2020

(51) Int. Cl.
*H04W 64/00*    (2009.01)
*G06F 16/9537*    (2019.01)
(Continued)

(52) U.S. Cl.
CPC ...... *H04W 64/003* (2013.01); *G06F 16/9537* (2019.01); *H04W 4/023* (2013.01);
(Continued)

(58) Field of Classification Search
CPC ........ G06F 16/9537; H04W 12/00518; H04W 36/36; H04W 60/00; H04W 64/00;
(Continued)

(56) References Cited

U.S. PATENT DOCUMENTS

| 8,423,791 B1 | 4/2013 | Yu et al. |
| 2003/0074471 A1* | 4/2003 | Anderson ......... H04L 29/12009 |
| | | 709/245 |

(Continued)

FOREIGN PATENT DOCUMENTS

| EP | 2988566 A1 | 2/2016 |
| WO | 2016032713 A2 | 3/2016 |

OTHER PUBLICATIONS

Katz-Bassett et al., "Towards IP Geolocation Using Delay and Topology", IMC'06, Oct. 25-27, 2006, Rio de Janeiro, Brazil. Measurements.

(Continued)

*Primary Examiner* — Srilakshmi K Kumar
*Assistant Examiner* — Jing Gao
(74) *Attorney, Agent, or Firm* — Lerner David LLP (57) ABSTRACT

Aspects of the technology evaluate a client device query to identify an IP address-based estimated location of a mobile device (602, 604). One or more candidate wireless stations are selected in accordance with the IP-based estimated location and a location-relevant response to the query is also generated in accordance with the IP-based location. This information is transmitted to the mobile device. (606, 608). The mobile device compares the received information about the candidate wireless stations against one or more actual wireless stations with which the mobile device is in communication (506, 508). Log information is generated as a result of the comparison. The log information is anonymized and transmitted to the network without user ID or other client-identifiable information included in the log. (FIG. 1, 510) The received log information is then used to validate the initial estimated location. Aggregation of log information from multiple devices may be used in the validation process.

20 Claims, 7 Drawing Sheets

(51) Int. Cl.
*H04W 4/02* (2018.01)
*H04W 4/029* (2018.01)
*H04W 8/26* (2009.01)
*H04W 80/04* (2009.01)

(52) U.S. Cl.
CPC ............ *H04W 4/029* (2018.02); *H04W 8/26* (2013.01); *H04W 80/04* (2013.01)

(58) Field of Classification Search
CPC . H04W 64/003; H04W 36/14; H04W 40/244; H04W 48/04; H04W 4/023; H04W 4/029; H04W 80/04; H04W 8/26; H04W 4/02; H04W 36/165; H04W 36/32; G01S 5/0036; G01S 5/02; G01S 5/0242; G01S 5/14; H04L 61/2007; H04L 67/12; H04L 61/609; H04L 67/125; H04L 43/0817; H04L 67/025; H04L 67/20; H04L 63/1425; H04L 67/18; H04L 63/0876; H04L 67/16; H04L 51/28; H04L 63/107; H04L 67/22
See application file for complete search history.

(56) References Cited

U.S. PATENT DOCUMENTS

| | | | |
|---|---|---|---|
| 2007/0298821 A1* | 12/2007 | Bush | H04W 84/20 455/507 |
| 2008/0225780 A1 | 9/2008 | McCormick et al. | |
| 2010/0210240 A1 | 8/2010 | Mahaffey et al. | |
| 2013/0159804 A1* | 6/2013 | Suzue | H04W 4/029 714/746 |
| 2014/0171109 A1 | 6/2014 | Segev | |
| 2014/0213283 A1* | 7/2014 | Gillett | G01S 5/0072 455/456.1 |
| 2014/0235266 A1* | 8/2014 | Edge | H04W 64/00 455/456.1 |
| 2014/0289822 A1* | 9/2014 | Wilson | H04L 9/3247 726/5 |
| 2015/0038162 A1* | 2/2015 | Duleba | H04L 67/18 455/456.1 |

OTHER PUBLICATIONS

Verve, Business Insider, "The Dirty Little Secret About Location-Targeted Mobile Ads," Feb. 19, 2013,http://www.businessinsider.com/the-secret-of-location-based-mobile-ads. retrieved from the internet Sep. 3, 2017.

The Google Maps Geolocation API, https://developers.google.com/maps/documentation/geolocation/intro, retrieved from the internet Sep. 3, 2017.

Ratti et al., "Mobile Landscapes—Using Location Data From Cell Phones for Urban Analysis," Environment and Planning B: Planning and Design 2006, vol. 33, pp. 727-748.

International Search Report and Written Opinion for PCT Application No. PCT/US2017/060172, dated Jul. 5, 2018. 15 pages.

Extended European Search Report for European Patent Application No. 22157627.5 dated May 13, 2022. 10 pages.

* cited by examiner

EVALUATING IP LOCATION ON A CLIENT DEVICE

CROSS-REFERENCE TO RELATED APPLICATION

This application is a national phase entry under 35 U.S.C. § 371 of International Application No. PCT/US2017/060172, filed Nov. 6, 2017, the entire disclosure of which is incorporated herein by reference.

BACKGROUND

Mobile applications may use Internet Protocol (IP)-based location information when device-based GPS or a network-based location is not available. However, IP-based location information can be inaccurate. It may also be challenging to evaluate the accuracy of such information. While it is possible to analyze records that capture both device-based (e.g., GPS) and IP-based geolocation, device location information may not available much of the time. An existing approach evaluates whether the IP-based location is correct. However, this approach evaluates the IP-based location information which is not used because device-based location information is available. This type of approach may only provide a general approximation that may not be very reliable. And such an approach is not feasible when the device-based location information is not available.

BRIEF SUMMARY

Aspects of the technology address such issues with a system that evaluates the IP-based location even when the mobile device location is not available. This approach includes verifying the location against the cellular tower, WiFi access point or other wireless station that the mobile device is connected to. Alternatively, other wireless stations that the mobile device "sees" but is not actively connected to may also be evaluated. The verification is performed by the mobile device based on candidate wireless stations identified by the network based on an IP address of the mobile device. Anonymized results of the verification are provided to a server or other network element. Aggregation of the anonymized results may be performed, which allows the network to validate location estimates in order to better serve location-relevant information to users.

According to one aspect, a computer-implemented location evaluation method is provided. The method includes transmitting, by a mobile device, a request in accordance with a client query. Here, the mobile device is configured to connect with each of a plurality of wireless stations in accordance with IP address information of the mobile device. The method also includes receiving, at the mobile device, a reply to the request, wherein the reply includes one or more responses to the client query and one or more identifiers for one or more respective candidate wireless stations associated with one or more estimated current locations of the mobile device. The one or more estimated current locations are based on the IP address information of the mobile device. The method further includes determining, by the mobile device, an identifier for a connected wireless station to which the mobile device is connected; determining, at the mobile device, whether the identifier for the connected wireless station corresponds to an identifier of any of the one or more respective candidate wireless stations; and transmitting, by the mobile device, selected log data based on the determination of whether the identifier for the connected wireless station corresponds to an identifier of at least one of said candidate wireless stations. The selected log data indicates an accuracy of the one or more estimated current locations based on the IP address information.

In one example, the selected log data is determined based on a randomly generated Boolean biased with a particular true probability that the identifier for the connected wireless station corresponds to the identifier of at least one of said candidate wireless stations. The selected log data may be determined as true with a first probability if the identifier for the connected wireless station corresponds to an identifier of at least one of said candidate wireless stations, and the log data may be determined as true with a second probability which is less than the first probability, if the identifier for the connected wireless station does not correspond to an identifier of at least one of said candidate wireless stations. In one scenario, the first probability and the second probability sum to 100%. The mobile device may create the selected log data in accordance with a statistical randomization factor. And the request may comprise a search request.

According to another aspect, a computer-implemented location evaluation method is provided, which includes receiving a client query from a mobile device, determining one or more estimated current locations for the mobile device based on IP address information of the mobile device, evaluating one or more responses to the client query based on the determined one or more estimated current locations for the mobile device and determining one or more identifiers for one or more respective candidate wireless stations associated with the one or more estimated current locations of the mobile device. The method also includes transmitting a given one of the one or more responses to the client query and one or more identifiers for one or more respective candidate wireless stations, for processing at the mobile device. In response to the transmitting, the method includes receiving selected log data from the mobile device. The selected log data has been generated at the mobile device based on a determination of whether an identifier for a wireless station to which the mobile device is connected corresponds to an identifier of at least one of the candidate wireless stations. The method further includes determining, from the received selected log data, an accuracy of the one or more estimated current locations.

In one example, the one or more estimated locations of the mobile device are determined based on an IP address location process which estimates the location of the mobile device with a certain probability. In another example, the one or more estimated locations of the mobile device are determined based on historical data associated with a user of the mobile device. The technology also includes an apparatus configured to carry out the methods presented above, and computer-readable instructions, which when executed by a computing apparatus, cause such methods to be performed.

According to a further aspect, a client device is provided, which comprises a user interface module including one or more user input devices configured to receive user input, a processing module including one or more processors, a memory module having one or more memories configured to store data and instructions for execution by the processing module, and a communication module including a wireless transceiver configured for bidirectional communication with one or more remote devices including one or more wireless stations in accordance with IP address information of the client device. The processing module is operatively coupled to the user interface module, memory module and the communication module, and the processing module is configured to transmit a request in accordance with the user input and receive a reply to the request. The reply includes one or more responses to the request and one or more identifiers for one or more respective candidate wireless stations associated with one or more estimated current locations of the client device. The one or more estimated current locations are based on the IP address information of the client device. The processing module is further configured to determine an identifier for a given wireless station to which the client device is actively or passively connected, determine whether the identifier for the actively or passively connected wireless station corresponds to an identifier of any of the one or more respective candidate wireless stations, and transmit selected log data based on the determination of whether the identifier for the connected wireless station corresponds to an identifier of at least one of said candidate wireless stations. The selected log data indicates an accuracy of the one or more estimated current locations based on the IP address information.

In one example, the selected log data is determined by the processing module based on a randomly generated Boolean biased with a particular true probability that the identifier for the connected wireless station corresponds to the identifier of at least one of said candidate wireless stations. The processing module is able to create the selected log data in accordance with a statistical randomization factor. And the request may comprise a search request.

According to another aspect of the technology, a server system is provided which comprises a processing module including one or more processors, a memory module having one or more memories configured to store data and instructions for execution by the processing module, and a communication module including a wireless transceiver configured for bidirectional communication with one or more remote devices including one or more wireless stations and one or more client devices. The processing module is operatively coupled to the memory module and the communication module, and is configured to receive a request from a client device. The processing module is also configured to determine one or more estimated current locations for the client device based on IP address information of the client device identified from the received request, evaluate one or more responses to the request based on the determined one or more estimated current locations for the client device, and determine one or more identifiers for one or more respective candidate wireless stations associated with the one or more estimated current locations of the client device. Based on this, the processing module is able to transmit a given one of the one or more responses to the request and one or more identifiers for one or more respective candidate wireless stations, for processing at the client device. In response to the transmission, the processing module is able to receive selected log data from the client device. The selected log data has been generated at the client device based on a determination of whether an identifier for a wireless station to which the client device is actively or passively connected corresponds to an identifier of at least one of the candidate wireless stations. The processing module is further able to determine, from the received selected log data, an accuracy of the one or more estimated current locations.

In one scenario, each wireless station comprises a cell tower or wireless access point. Identification and location information about the one or more respective candidate wireless stations may be stored in a database operatively coupled to the processing module. The processing module is further operative to store the received selected log data in a database operatively coupled to the processing module. And the selected log data may include some form of anonymization according to a statistical randomization factor.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

The methodology includes maintaining a reverse map of location information to candidate wireless stations. The candidate wireless stations may be cell towers, WiFi access points or other types of base stations (collectively, wireless stations). For example, the reverse map may store cell tower IDs with their corresponding physical locations. This information is stored on the network side, for instance in databases of one or more servers.

Upon receipt of a client-side query or other request from a mobile client device, such as a web search, the network side estimates the current location of the mobile device with a certain probability. In the case where the mobile device provides a device-based location, this may be unnecessary. However, in many situations such as when the mobile device is in an indoor location or location-based services are not enabled, the network-side estimate is performed. The estimate is based on the IP address of the mobile device, which is identified from the query or other request. Should a different communication protocol be used, then the estimate would be similarly based on the address information of the mobile device in accordance with the other protocol.

A set of candidate wireless stations is selected using the estimated mobile device location. For instance, information about some or all cell towers or access points associated with the estimated mobile device location will be sent to the mobile device as part of the response to the query. In one example, the cell towers within a 1 km radius of the estimated location are selected. In another example, the radius may be between 0.1 km and 5 km. In a further example, the radius may be more than 2 km. And in yet another example, the radius may be no more than 10 km. The radius may be varied based on predetermined factors including the number of towers in the database, whether the estimated location is in an urban, suburban or rural location, the number of active client devices on the network, any combination of these, etc.

The response to the query will typically include location-relevant content selected based on the estimated mobile device location. In addition, the response also includes the set of candidate wireless stations. In one example, the query response and set of candidate wireless stations are provided together, such as in one or more data packets. In another example, the query response and set of candidate wireless stations may be provided separately.

On the client side, once the mobile device receives the response it is able to act on the response and the received set of candidate wireless stations. For instance, the application or other service that issued the query or other request may provide relevant search results to a user of the mobile device. The app or other process running on the mobile device also evaluates the received candidate information. In particular, there is a comparison of the currently connected cell tower or other wireless station against the received information to determine if there is a match. If so, the IP-based location estimated by the network is correct. If not, the IP-based location is wrong.

Figure 1:
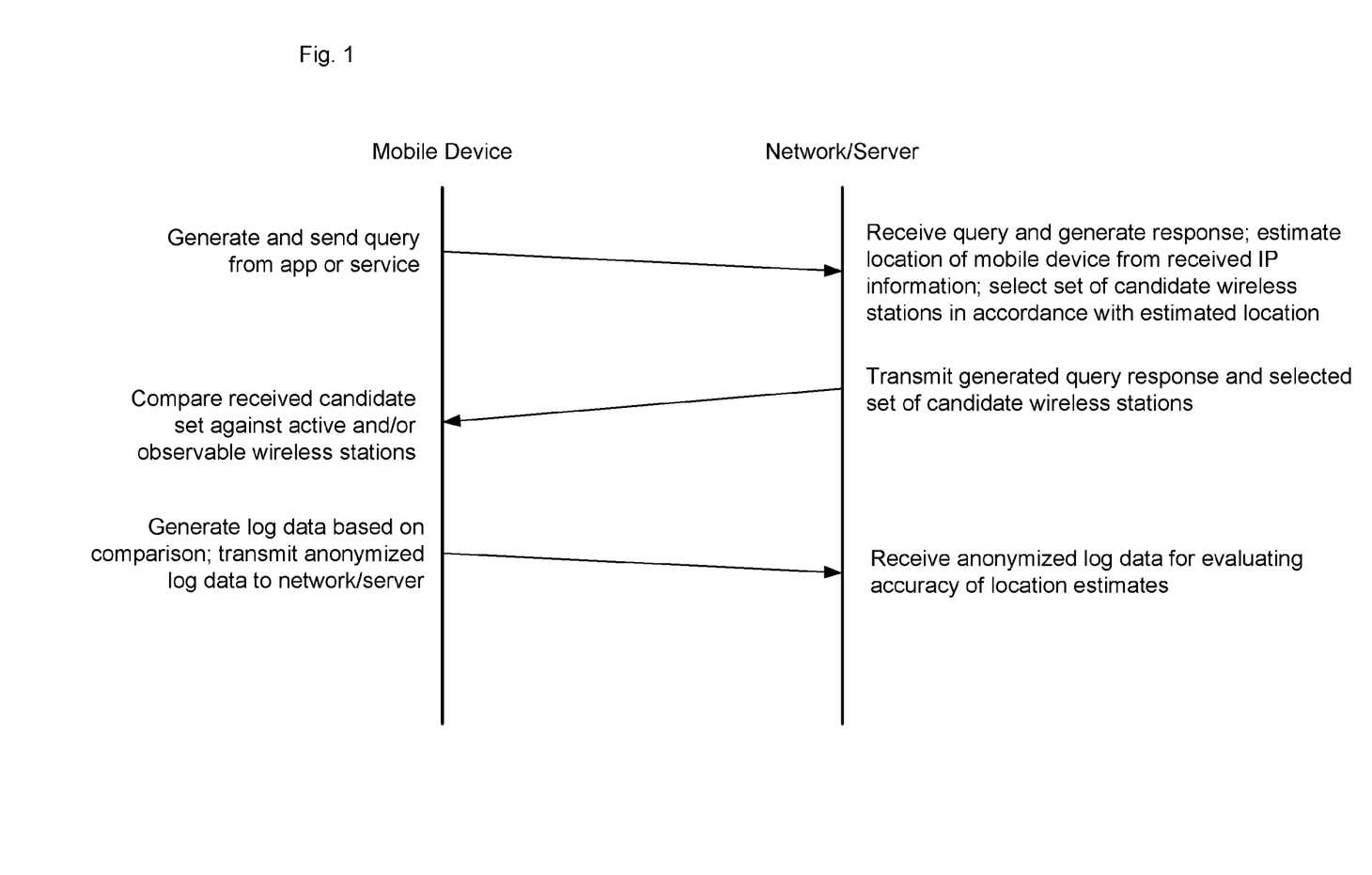
FIG. 1 illustrates a location evaluation procedure in accordance with aspects of the disclosure.

In response to this comparison, the mobile device creates log information indicating whether there are matches. For instance, the log data may be Boolean, where a 1 equals true (correct) and a 0 equals false (wrong). In one scenario, the log information may be accumulated over a given period of time, e.g., an hour, day, etc., before being transmitted to the network. In another scenario, the log information is transmitted immediately upon determination of a match or no match. This information, once received at the network, may be aggregated and used to evaluate the accuracy of location estimates. FIG. 1 illustrates an example query and response process in accordance with the above discussion. These and other aspects of the technology are further described below.

Example Arrangement

Figure 2A:
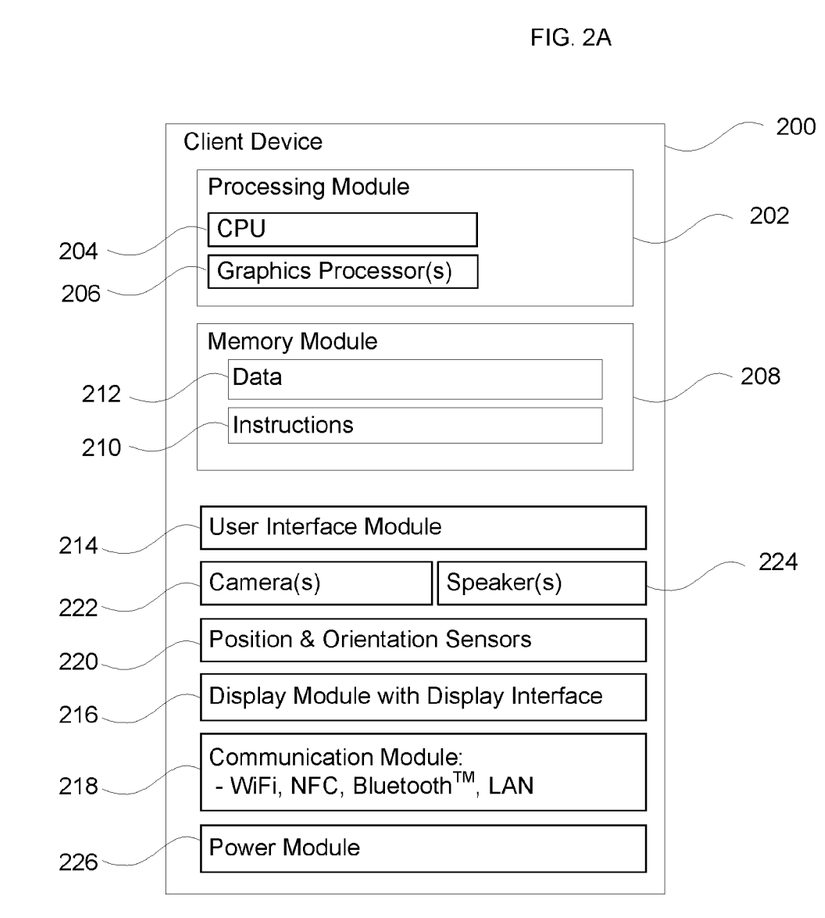
FIG. 2A is an example mobile client device configured to implement the location estimate and determination process in accordance with aspects of the disclosure.

FIG. 2A illustrates an example mobile client device 200 that may be employed with the techniques disclosed herein. As shown, the device 200 includes a processing module 202 having one or more computer processors such as a central processing unit 204 and/or graphics processors 206, as well as memory module 208 configured to store instructions 210 and data 212. The processors may or may not operate in parallel, and may include ASICs, controllers and other types of hardware circuitry. The processors are configured to receive information from a user through user interface module 214, and to present information to the user on a display device of the display module 216 having a display interface.

User interface module 214 may receive commands from a user via user inputs and convert them for submission to a given processor. The user inputs may include one or more of a touch screen, keypad, mouse, stylus, microphone, or other types of input devices. The display module 216 may comprise appropriate circuitry for driving the display device to present graphical and other information to the user. By way of example, the graphical information may be generated by the graphics processor(s) 206, while CPU 204 manages overall operation of the client device 200. The graphical information may display responses to user queries on the display module 216. For instance, the processing module may run a browser application or other service using instructions and data stored in memory module 208, and present information associated with the browser application or other service to the user via the display module 216.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVDs, CD-ROMs, high-density tape drives, and other types of write-capable or read-only memories. In one implementation, a computer program product is tangibly embodied in an information carrier. The computer program product contains instructions, such as instructions 210 that, when executed by one or more processors, perform one or more methods such as those described herein. The information carrier is a computer- or machine-readable medium, such as memory module 208. Although FIG. 2A functionally illustrates the processor(s), memory module, and other elements of device 200 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 2A, the mobile client device 200 includes a communication module 218 for communicating with other devices and systems. The communication module 218 includes a wireless transceiver; alternatively, the module may include a wired transceiver in addition to or in place of the wireless transceiver. The client device 200 may communicate with other remote devices via the communication module 218 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the client device 200 as shown includes one or more position and orientation sensors 220. The position and orientation sensors 220 are configured to determine the position and orientation of client device 200. For example, these components may include a GPS receiver to determine the device's latitude, longitude and/or altitude as well as an accelerometer, gyroscope or another direction/speed detection device. The client device 200 may also include one or more camera(s) 222 for capturing still images and recording video streams, speaker(s) 224 and a power module 226, as well as actuators (not shown) to provide tactile feedback or other information to the user.

Figure 2B:
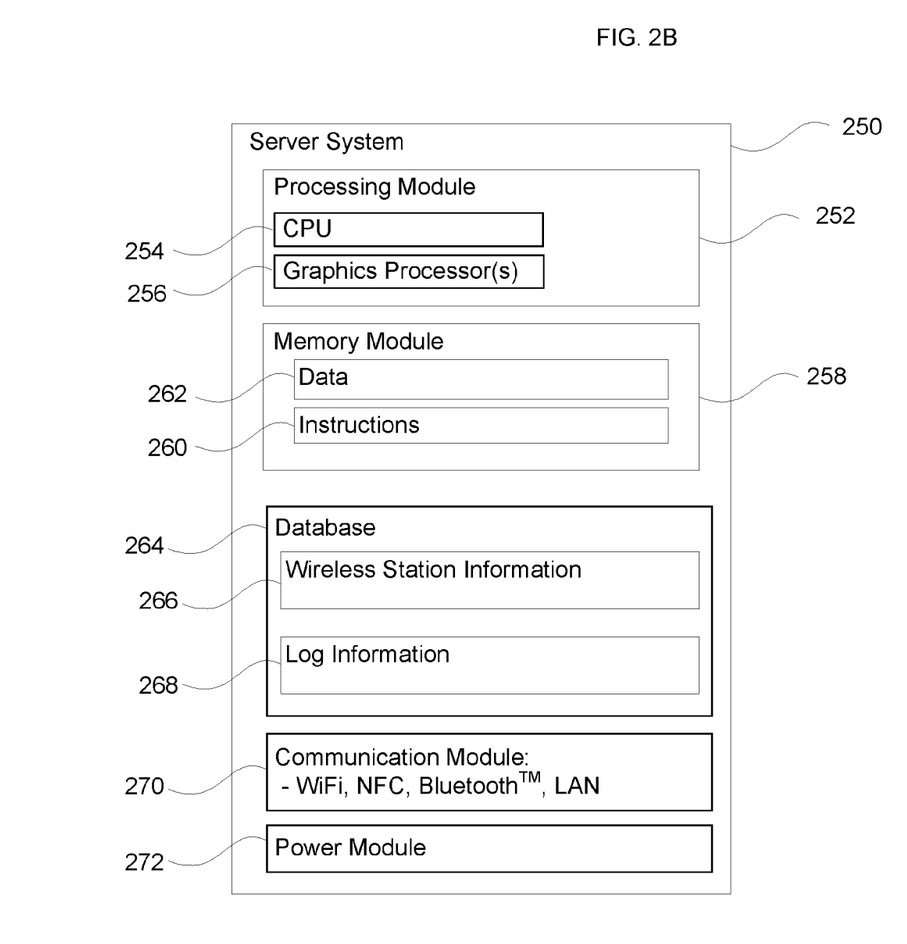
FIG. 2B is an example server system configured to implement the location estimate and determination process in accordance with aspects of the disclosure.

FIG. 2B illustrates an example server system 250 that may be employed with the techniques disclosed herein. As shown, the server system 250 includes various components similar to those described above for the mobile client device 200. For instance, server device includes a processing module 252 having one or more computer processors such as a central processing unit 254 and/or graphics processors 256, as well as memory module 258 configured to store instructions 260 and data 262. The processors may or may not operate in parallel, and may include ASICs, controllers and other types of hardware circuitry.

As with memory module 208, memory module 258 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 258 may also include DVDs, CD-ROMs, high-density tape drives, and other types of write-capable or read-only memories. In one implementation, a computer program product is tangibly embodied in an information carrier. The computer program product contains instructions, such as instructions 260 that, when executed by one or more processors, perform one or more methods such as those described herein. The information carrier is a computer- or machine-readable medium, such as memory module 208. Although FIG. 2B functionally illustrates the processor(s), memory module, and other elements of server system 250 as being within the same overall block, such components may or may not be stored within the same physical housing. For example, some or all of the instructions and data may be stored on an information carrier that is a removable storage medium (e.g., optical drive, high-density tape drive or USB drive) and others stored within a read-only computer chip.

The data 262 of memory module 258 may be retrieved, stored or modified by the processors in accordance with the instructions 260. For instance, although the claimed subject matter is not limited by any particular data structure, the data may be stored in computing device registers, in a relational database as a table having a plurality of different fields and records, XML documents or flat files. The data may also be formatted in any computing device-readable format. As with instructions 210, the instructions 260 may be any set of instructions to be executed directly (such as machine code) or indirectly (such as scripts) by the processor(s), and the above discussion of instructions 210 applies to instructions 260 as well.

By way of example, the processors of the processing module 252 may be arranged in a distributed architecture. In a distributed architecture, the server system 250 may comprise multiple server units, for instance in a cloud computing arrangement. Whether in an inclusive or distributed architecture, the processors are operatively coupled to database 264. As shown, the database 264 includes information 266 about wireless stations in the network associated with the server system 250. For example, this information may include cell tower information, wireless access point information, and/or information about other types of base stations used by the network to communicate with client devices including mobile client device 200.

In one example, the wireless station information 266 includes geolocation data about the specific physical locations of the wireless stations. This may be in the form of a reverse map of location information to candidate wireless stations. The map may be a cell tower map with cell tower identifiers, latitude and longitude coordinates and other data corresponding to the wireless stations, such as country or region information. The cell tower map may include a spatial index of the wireless stations in the network or a region within the network.

The database 264 may also include log information 268 received from various client devices. The log information 268 is received in response to the wireless station comparison performed at the client device. Upon receipt by the server system, the log information from a given client device may be aggregated with log information from other client devices. As noted above and as discussed further below, the log information is provided by the client devices in an anonymized manner.

While the database 264 is shown as including both the wireless station information 266 and the log information 268, such information may be stored in multiple discrete databases. The databases may be distributed, for instance across multiple memory modules or other storage devices of a cloud computing architecture.

As also shown in FIG. 2B, the server system 250 includes a communication module 270 for communicating with other devices and systems, including with client devices and other elements in the network. The communication module 270 includes a wireless transceiver. The communication module 270 may also include a wired transceiver in addition to or in place of the wireless transceiver. The server system 250 may communicate with other remote devices via the communication module 270 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing.

In addition, the server system 250 as shown includes a power module 272. Other system elements, including computer components shown in FIG. 2A, may also be included within the server system 250.

Figure 3:
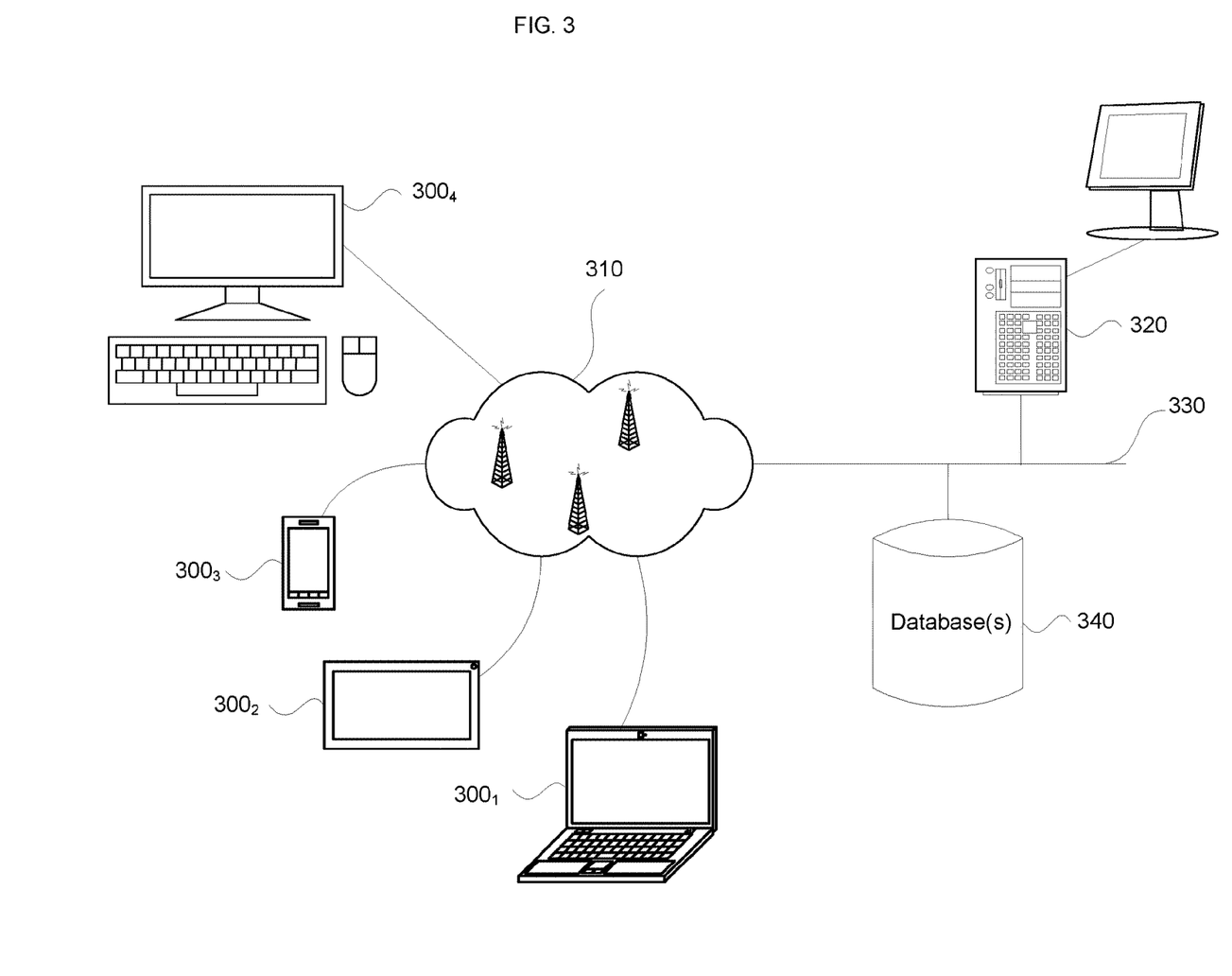
FIG. 3 illustrates an example network in accordance with aspects of the disclosure.

FIG. 3 illustrates an example arrangement in which different client devices 300, e.g., $300_1$, $300_2$, $300_3$ and $300_4$ may request content or other information from server 320 via communication system 310. The client devices 300 may include some or all of the components discussed above with regard to client device 200. The client devices may include mobile/portable devices such as laptops ($300_1$), tablets ($300_2$), cellular phones or PDAs ($300_3$), or quasi-stationary devices such as desktop PCs ($300_4$). However, other client devices, including wearable electronics such as smart watches, may also be employed. Any such client device may send requests as shown in FIG. 1 and receive query results and wireless station information from the server system as discussed herein.

By way of example only, the client device queries may be parsed and routed to a service on the network. The service may include a query response service and an IP location estimation service associated with server 320. While one server is shown, the functionality of the location estimation and query response services may be performed by one or more server devices or other computer systems, such as a cloud computing network. The queries, IP location estimates and corresponding responses may be passed via bus 330. One or more databases 340 (corresponding to database 264 of FIG. 2B) may be used by the services to resolve the client device location based on its IP address, and/or to provide relevant query results in accordance with the estimated IP address-based location information.

Example Methods and Use Cases

As noted above, features of the technology can be implemented in different use cases. Example use cases are discussed below. For instance, in one use case the user may request information via a mobile app or service on the client device. By way of example, the information could be about a point of interest such as a restaurant, coffee shop, car dealership, museum, etc. Other use cases may involve on-line shopping or other order placement. Further examples may include map or direction queries. Nonetheless, the technology is query-agnostic.

Regardless of the type of query or the application or service managing the query on the mobile client device, the query is sent to the network via the communication module of the client device. Upon receipt by the communication module of the server system, the query is analyzed and the IP address information from the corresponding data packet(s) is evaluated. The evaluation identifies a likely location of the mobile client device. Based on this evaluation, the server system selects a set of candidate wireless stations from the database for the likely location. In particular, one or more candidate wireless stations are selected that are within communication range of the likely location. As noted above, the candidate wireless stations may include cell towers, access points and other types of base stations. In one instance, different types and combinations of such stations may be evaluated as possible candidate wireless stations.

The candidates are chosen such that they are within a desired radius or other range. Thus, cell towers or wireless access points within a 1 km radius may be selected. As noted above, the radius may be different, for instance between 0.1 km and 5 km, more than 2 km, or no more than 10 km. The server system may select the radius or other range in accordance with one or more predetermined factors. This may include the number of wireless stations in the database, the location type (e.g., urban, suburban or rural location), and/or the number of active client devices on the network.

The server system returns both the query response and the selected set of candidate wireless stations. At the mobile device, the query is processed by the app or service that made the request so that relevant information may be presented to the user. This may include providing a list of search results, a map and/or other data.

The mobile device also analyzes the received information about the set of candidate wireless stations. Depending on the type(s) of wireless stations, the received information may include a base station identifier, a wireless access point identifier or some other unique indication about the wireless stations. The received information also includes location data, such as latitude and longitude information or other physical coordinates, about the respective candidate wireless stations.

Figure 4:
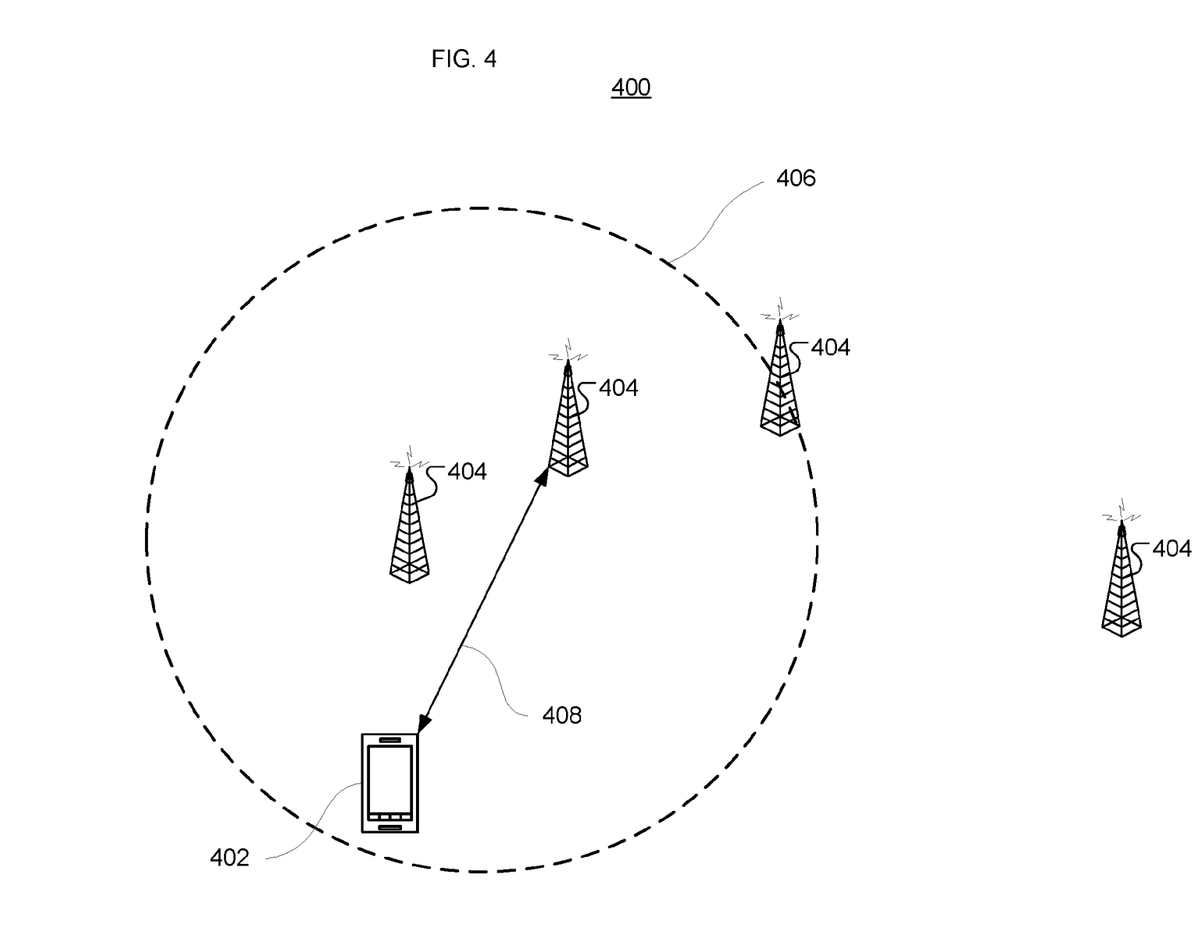
FIG. 4 illustrates an example of wireless stations within range and out of range of a mobile device in accordance with aspects of the disclosure.

One or more processors of the mobile device perform a comparison of the set of candidate wireless stations against wireless stations "seen" by the mobile device. FIG. 4 illustrates a scenario 400 including mobile device 402 and several wireless stations 404. As shown, a pair of the wireless stations 404 may be within a selected area 406, while a third may be on the border of the area and a fourth is outside the area entirely. The wireless stations are directly or indirectly coupled to the server system, for instance via communication system 310 of FIG. 3.

In the example of FIG. 4, the mobile device 402 is currently actively communicating with one wireless station as shown by line 408. The other wireless stations within or adjacent to the selected area 406 may be part of a set of wireless stations that is visible to the mobile device even though it is not actively communicating with them. That may change as the mobile device moves, as atmospheric conditions or received signal strength change, as more devices communicate on the network or due to other factors. The active wireless station may change and the mobile device may be handed off or otherwise connect to a different wireless station. Regardless, the mobile device maintains a list of active and/or visible wireless stations in memory.

In one example, the mobile device compares the information about the wireless station it is currently actively connected to against the set of received information provided by the server system. In another example, the mobile device compares the information about some or all of the visible wireless stations against the set of received information. In some situations, the other visible but not actively connected wireless stations may be considered to be passively connected. If the active wireless station or any of the visible wireless stations match to a wireless station included in the set of received information, the mobile device makes note of this and stores it in memory. According to one scenario, the data is stored as log information in memory. As noted above, the log information may be represented as simple Boolean data, where a 1 equals true (correct) and a 0 equals false (wrong). The log information may be accumulated over a given period of time, e.g., an hour, day, etc. before transmission to the server system. Alternatively, the log information may be transmitted. Once transmitted, the log information may be deleted from memory of the mobile device.

It is important to note that when the log information is sent to the server system by the mobile device, no user ID or other client-identifiable information is included in the log. As an added layer of security, statistical randomization is performed on the log data. The anonymized data configured to be transmitted to the server system by the mobile device.

One approach to statistical randomization is as follows, where r is a return Boolean, Nt is the number of r=true instances in the mobile device log, and N is the total number of events in the log. Here, the mobile device secretly generates a random Boolean b1, biased with probability $P(b1=true)=p1$. If b1=true, then the mobile device sets r in the log information by answering truthfully to the answer, where $P(true)=p$; $P(false)=1-p$. If b1=false, then the mobile device generates a new random Boolean b2, biased with probability $P(b2=true)=p2$, and return r=b2. The unbiased estimate for P can be obtained with the following formula:

$$p=1/p1*(Nt/N-(1-p1)*p2)$$

The probabilities/bias factors b1 and b2 can be adjusted to balance between the user privacy and the desired variance.

In an alternative approach, a selected amount of "noise" is added to the Boolean information. For instance, 10% of the results may be reported as true when they were false, with the same percentage reported as false when they were true. This improves privacy for each mobile device. And when aggregated over many mobile devices on the network side, the overall log results will provide a reliable measure of how accurate the IP-based location information is. In one particular example, to "denoise" the received log data the system can perform a linear transformation such as f(x)= (x−0.1)/0.8. This linear transformation will increase variance as V(f(x))=V((x−0.1)/0.8)=V(x/0.8)=(1/0.8)**2 V(x). The standard deviation therefore increased by a factor of 10/8.

Regardless of the specific approach taken to introduce statistical randomization into the log data, it provides additional security and privacy protection. This anonymized log data is sent to the server system. On the server side, as noted above the system may aggregate the log information for multiple client devices. One benefit of this is that the aggregation takes into account the statistical randomization while allowing the system to verify the accuracy of its IP-based location estimates. This is because in the aggregate, the number of false positives and false negatives introduced into the log data tend to cancel out. Thus, when the server system evaluates past IP-based location estimates across a large data set, it will be able to determine whether those past estimates are accurate enough to provide meaning responses to client device queries. As an added layer of protection, the "time to live" (TTL) for the log information stored by the server system, e.g., log information 268 in database 264 of FIG. 2B, may be selected for only a few days or hours. In one example, the TTL may be 3 days. In another example, it is less than one week. And in a further example, the TTL is selectively set by the system in accordance with factors including the quantity of log results received over a selected time period and the desired accuracy of the IP-based location estimates.

Figure 5:
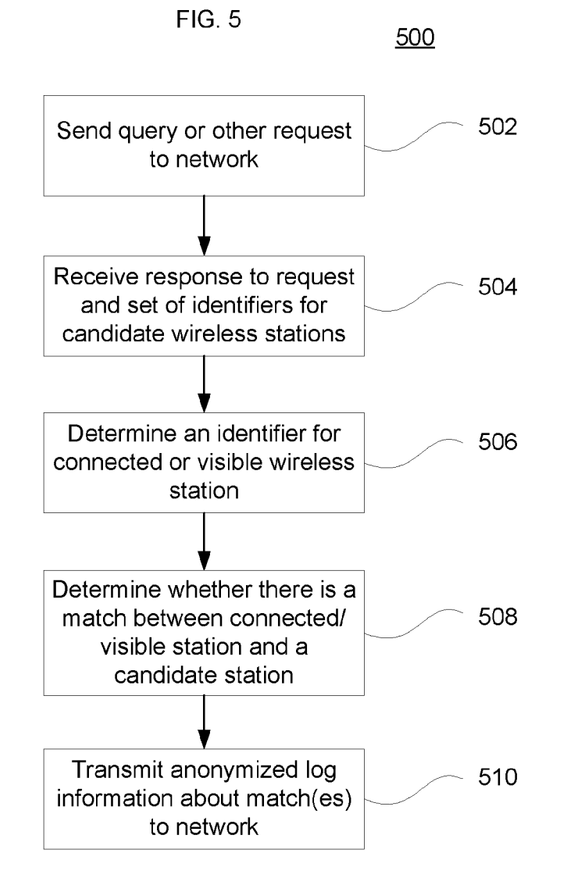
FIG. 5 illustrates a process for mobile device location evaluation in accordance with aspects of the disclosure.

One example scenario is shown in relation to flow diagram 500 of FIG. 5. Here, in block 502 the mobile device transmits a query or other request to one or more wireless stations of a communication network. In block 504, the mobile device receives a response to the request form the network, for instance from a server system associated with the network. The response includes one or more identifiers for a set of candidate wireless stations. The candidates are chosen in accordance with one or more estimated locations of the mobile device. At block 506, the mobile device determines an identifier for a wireless station to which the mobile device is connected or otherwise has visibility to. As noted above, this may be a wireless station that the mobile device is actively communicating with. Or it may be a wireless station in a set of visible wireless stations maintained by the mobile device. This determination may occur before, during or after the response is received.

Upon receipt of the set of candidates, one or more processors of the mobile device determine at block 508 whether the identifier for the connected (or visible) wireless station matches or otherwise corresponds to an identifier of at least one of the candidate wireless stations. At this point, if there is a match the mobile device indicates that in its log information. Then at block 510 the mobile device transmits the log information based on the determination of whether there is a match or other correspondence between the connected (or visible) wireless station and one of the candidate wireless stations. And as noted above, the log information is anonymized prior to transmission via a statistical randomization approach so that no user ID or other client-identifiable information is included in the transmitted log.

Figure 6:
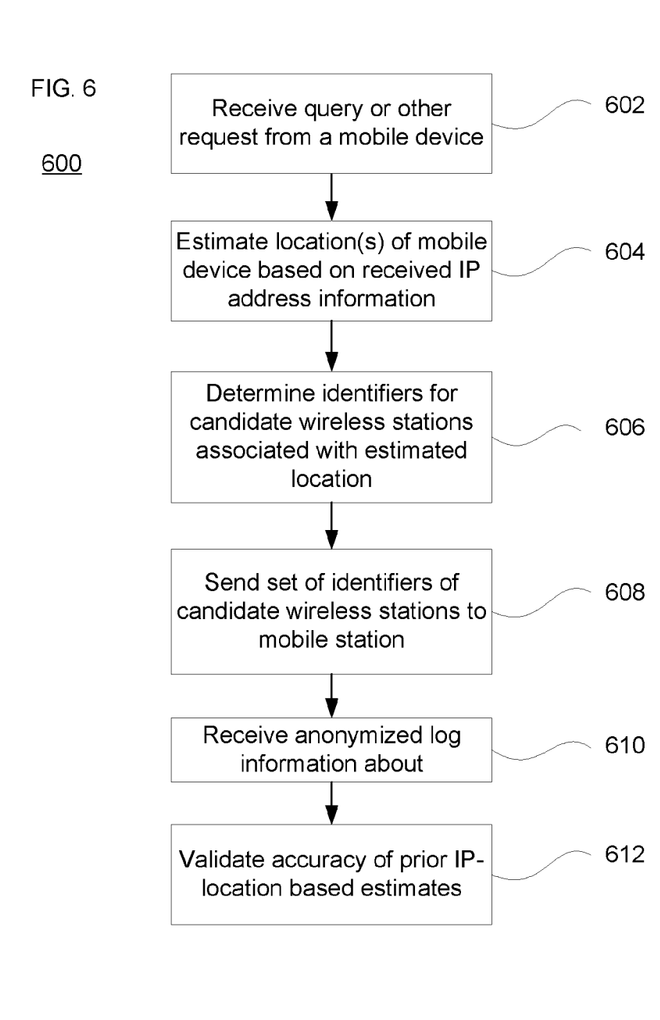
FIG. 6 illustrates a process for server system location evaluation in accordance with aspects of the disclosure.

Another example scenario is shown in relation to flow diagram 600 of FIG. 6. Here, in block 602 the query or other request from the mobile device is received by the network, for instance at the server system described above. At block 604, one or more estimated locations for the mobile device are made by the server system. This is done based on the IP address information associated with the request. A response to the request may be generated based on the estimated location(s).

Then at block 606, the system determines one or more identifiers for one or more respective candidate wireless stations associated with the estimated location(s). At block 608, the set of identifiers for the one or more candidate wireless stations are transmitted to the mobile device for processing in the manner described above. This is preferably done in conjunction with transmitting the response to the query or other request. In response to the processing by the mobile device, at block 610 the anonymized log information is received. The log information generated by the mobile device is based on a determination of whether an identifier for a wireless station to which the mobile device is connected or is visible corresponds to an identifier of one of the candidate wireless stations. The server system uses the anonymized log information to validate whether prior IP-based location estimates were accurate at block 612. In response to this, the system may adjust the process used to generate future location estimates based on received IP address information. Thus, the system is able to increase location accuracy using anonymized data. This is done with minimal additional processing by the mobile devices, and with limited temporary data storage in the server's database.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A computer-implemented location evaluation method, comprising:
   transmitting, by a mobile device, a request in accordance with a client query, wherein the mobile device is configured to connect with each of a plurality of wireless stations in accordance with IP address information of the mobile device;
   receiving, at the mobile device, a reply to the request, wherein the reply includes one or more responses to the client query and one or more identifiers for one or more respective candidate wireless stations associated with one or more estimated current locations of the mobile device, the one or more estimated current locations of the mobile device being based on the IP address information of the mobile device;
   determining, by the mobile device, an identifier for a connected wireless station to which the mobile device is connected;
   determining, at the mobile device, whether an estimated current location of the mobile device that is based on the IP address information of the mobile device is correct, comprising determining whether the identifier f or the connected wireless station corresponds to an identifier of at least one of the one or more respective candidate wireless stations; and transmitting, by the mobile device, selected log data indicating an accuracy of the one or more estimated current locations of the mobile device based on the determination of whether the identifier for the connected wireless station corresponds to the identifier of the at least one of said candidate wireless stations.

2. A computer-implemented location evaluation method as claimed in claim 1, wherein the selected log data is determined based on a randomly generated Boolean biased with a particular true probability that the identifier for the connected wireless station corresponds to the identifier of at least one of said candidate wireless stations.

3. A computer-implemented location evaluation method as claimed in claim 1, wherein the selected log data is determined as true with a first probability if the identifier for the connected wireless station corresponds to an identifier of at least one of said candidate wireless stations, and wherein the log data is determined as true with a second probability which is less than the first probability, if the identifier for the connected wireless station does not correspond to an identifier of at least one of said candidate wireless stations.

4. A computer-implemented location evaluation method as claimed in claim 2, wherein the first probability and the second probability sum to 100%.

5. A computer-implemented location evaluation method as claimed in claim 1, wherein the mobile device creates the selected log data in accordance with a statistical randomization factor.

6. A computer-implemented location evaluation method as claimed in claim 1, wherein the request comprises a search request.

7. A computer-implemented location evaluation method, comprising:
    receiving a client query from a mobile device;
    determining one or more estimated current locations for the mobile device based on IP address information of the mobile device;
    evaluating one or more responses to the client query based on the determined one or more estimated current locations for the mobile device;
    determining one or more identifiers for one or more respective candidate wireless stations associated with the one or more estimated current locations of the mobile device;
    transmitting a given one of the one or more responses to the client query and one or more identifiers for one or more respective candidate wireless stations, for processing at the mobile device;
    in response to the transmitting, receiving selected log data from the mobile device, the selected log data having been generated at the mobile device based on a determination of whether an identifier for a wireless station to which the mobile device is connected corresponds to an identifier of at least one of the candidate wireless stations; and
    determining, from the received selected log data, an estimated current location of the mobile device that is based on the IP address information of the mobile device is correct, comprising determining whether an accuracy of the one or more estimated current locations of the mobile device based on whether the identifier for the wireless station to which the mobile device is connected corresponds to the identifier of the at least one of the candidate wireless stations.

8. A computer-implemented method according to claim 7, wherein the one or more estimated locations of the mobile device are determined based on an IP address location process which estimates the location of the mobile device with a certain probability.

9. A computer-implemented method according to claim 7, wherein the one or more estimated locations of the mobile device are determined based on historical data associated with a user of the mobile device.

10. Apparatus configured to carry out the method of claim 7.

11. Computer-readable instructions, which when executed by computing apparatus, cause the method of claim 7 to be performed.

12. A client device, comprising:
    a user interface module including one or more user input devices configured to receive user input;
    a processing module including one or more processors;
    a memory module having one or more memories configured to store data and instructions for execution by the processing module; and
    a communication module including a wireless transceiver configured for bidirectional communication with one or more remote devices including one or more wireless stations in accordance with IP address information of the client device;
    wherein the processing module is operatively coupled to the user interface module, memory module and the communication module, and the processing module is configured to:
    transmit a request in accordance with the user input;
    receive a reply to the request, wherein the reply includes one or more responses to the request and one or more identifiers for one or more respective candidate wireless stations associated with one or more estimated current locations of the client device, the one or more estimated current locations of the mobile device being based on the IP address information of the client device;
    determine an identifier for a given wireless station to which the client device is actively or passively connected;
    determine whether an estimated current location of the mobile device that is based on the IP address information of the mobile device is correct, comprising determining whether the identifier for the actively or passively connected wireless station corresponds to an identifier of at least one of the one or more respective candidate wireless stations; and
    transmitting selected log data indicating an accuracy of the one or more estimated current locations of the mobile device based on the determination of whether the identifier for the connected wireless station corresponds to the identifier of the at least one of said candidate wireless stations.

13. A client device as claimed in claim 12, wherein the selected log data is determined by the processing module based on a randomly generated Boolean biased with a particular true probability that the identifier for the connected wireless station corresponds to the identifier of at least one of said candidate wireless stations.

14. A client device as claimed in claim 12, wherein the processing module creates the selected log data in accordance with a statistical randomization factor.

15. A client device as claimed in claim 12, wherein the request comprises a search request.

16. A server system, comprising:
a processing module including one or more processors;
a memory module having one or more memories configured to store data and instructions for execution by the processing module; and
a communication module including a wireless transceiver configured for bidirectional communication with one or more remote devices including one or more wireless stations and one or more client devices;
wherein the processing module is operatively coupled to the memory module and the communication module, and the processing module is configured to:
receive a request from a client device;
determine one or more estimated current locations for the client device based on IP address information of the client device identified from the received request;
evaluate one or more responses to the request based on the determined one or more estimated current locations for the client device;
determine one or more identifiers for one or more respective candidate wireless stations associated with the one or more estimated current locations of the client device;
transmit a given one of the one or more responses to the request and one or more identifiers for one or more respective candidate wireless stations, for processing at the client device;
in response to the transmission, receive selected log data from the client device, the selected log data having been generated at the client device based on at least a determination of whether an estimated current location of the mobile device that is based on the IP address information of the mobile device is correct, such determination comprising determining whether an identifier for a wireless station to which the client device is actively or passively connected corresponds to an identifier of at least one of the candidate wireless stations; and
determine, from the received selected log data, an accuracy of the one or more estimated current locations of the mobile device based on whether the identifier for the wireless station to which the mobile device is connected corresponds to the identifier of the at least one of the candidate wireless stations.

17. A server system as claimed in claim 16, wherein each wireless station comprises a cell tower or wireless access point.

18. A server system as claimed in claim 16, wherein identification and location information about the one or more respective candidate wireless stations is stored in a database operatively coupled to the processing module.

19. A server system as claimed in claim 16, wherein the processing module is operative to store the received selected log data in a database operatively coupled to the processing module.

20. A server system as claimed in claim 16, wherein the selected log data includes anonymization according to a statistical randomization factor.

* * * * *